United States Patent
Schierling

(10) Patent No.: US 7,529,111 B2
(45) Date of Patent: May 5, 2009

(54) DRIVE CONTROLLER FOR A SELF-COMMUTATED CONVERTER

(75) Inventor: Hubert Schierling, Erlangen (DE)

(73) Assignee: Siemens Aktiengesellschaft, München (DE)

(*) Notice: Subject to any disclaimer, the term of this patent is extended or adjusted under 35 U.S.C. 154(b) by 474 days.

(21) Appl. No.: 11/224,735

(22) Filed: Sep. 12, 2005

(65) Prior Publication Data

US 2006/0056212 A1    Mar. 16, 2006

(30) Foreign Application Priority Data

Sep. 10, 2004   (DE) .................. 10 2004 043 877

(51) Int. Cl.
*H02M 3/24*    (2006.01)
*H02M 7/5387*  (2007.01)

(52) U.S. Cl. .......................... 363/98; 363/132

(58) Field of Classification Search .............. 363/16, 363/17, 95, 97, 98, 131, 132; 318/800, 801, 318/254.1

See application file for complete search history.

(56) References Cited

U.S. PATENT DOCUMENTS

| | | | |
|---|---|---|---|
| 6,573,681 B2 | 6/2003 | Schwesig | |
| 6,690,592 B2 * | 2/2004 | Link | 363/98 |
| 6,850,424 B2 * | 2/2005 | Baudelot et al. | 363/37 |
| 2004/0165404 A1 | 8/2004 | Eckardt et al. | |

FOREIGN PATENT DOCUMENTS

DE    100 59 173    3/2002

OTHER PUBLICATIONS

Publication: "IGBT-Module in Stromrichtern: regeln, steuern, schützen", Werner Bösterling, Ralf Jörke and Maring Tscharn ,,etz, vol. 110 (1989, issue 10, pp. 464-471.

* cited by examiner

*Primary Examiner*—Matthew V Nguyen
(74) *Attorney, Agent, or Firm*—Henry M. Feiereisen; Ursula B. Day

(57) ABSTRACT

A drive controller for a self-commutated converter providing a "safe stop" is described. The converter has two half-bridges, and the drive controller includes two control circuits having outputs operatively connected to respective converter valves of the half-bridges. Pulse inhibiting controllers are associated with the control circuits in one-to-one correspondence. The drive controller further includes a plurality of switches, each switch defining a disconnectable pulse inhibiting path and receiving control signals from one of the pulse inhibiting controllers. Each of the pulse inhibiting paths has an input which is connected to an external voltage, and an output which is connected, on one hand, via a diagnostic line to a corresponding pulse inhibiting controller and, on the other hand, to a control input of the corresponding control circuit. The switches can therefore be cyclically tested without service interruption.

6 Claims, 2 Drawing Sheets

US 7,529,111 B2

DRIVE CONTROLLER FOR A SELF-COMMUTATED CONVERTER

CROSS-REFERENCES TO RELATED APPLICATIONS

This application claims the priority of German Patent Application, Serial No. 10 2004 043 877.3, filed Sep. 10, 2004, pursuant to 35 U.S.C. 119(a)-(d), the disclosure of which is incorporated herein by reference.

BACKGROUND OF THE INVENTION

The present invention relates to a drive controller for a self-commutated converter, and more particularly to a drive controller with a switched control circuit for the converter valves that can be dynamically and cyclically tested without interrupting service.

Great care must be exercised when using electric drives in industrial automation applications, for example with numerically controlled machine-tools and robots, to protect men and machine in the best possible manner. The electrical machine or the motor should be prevented from performing dangerous movements even when a single error occurs, by implementing a "safe stop" function for the motor. This function is typically initiated depending on the operating mode, e.g., before a protective door is opened.

The "safe stop" function is implemented by disconnecting the electric power in two places, for example, by also disconnecting the motor. It is generally accepted to separately disconnect the lower and/or upper converter valves of a self-commutated converter employing a bridge circuit.

A "safe stop" function can be implemented by "safely" blocking the control signals to the converter valves, which is referred to in the art also as "pulse inhibitor", or to disconnect all converter valves.

The term "safely" is intended to indicate that the regulatory requirements imposed or suggested by the professional organizations or regulatory bodies for occupational safety are satisfied.

A conventional drive controller of this type is known from the German patent DE 100 59 173, as shown in detail in FIG. 1. The self-commutated converter W has two half-bridges with converter valves T1, T3, T5, and T2, T4, T6, respectively. The drive controller has a separate control circuit for each half-bridge. Of the control circuits, only the associated opto-couplers OK1, OK3, OK5 for the upper half-bridge, and OK2, OK4, OK6 for the lower half-bridge are shown in FIG. 1. The anodes of the photodiodes of the opto-couplers OK1, OK3, OK5 and OK2, OK4, OK6 are electrically connected with respective supply voltages SV1 and SV2, whereas the cathodes are electrically connected with corresponding pulse inhibiting circuits I1 and I2 via resistors RS1, RS3, RS5, and RS2, RS4, RS6, and forward-biased diodes DS1, DS3, DS5, and DS2, DS4, DS6 connected downstream of the resistors. The function "safe stop" is "reliably" selected via the two signals SH1 and SH2 via the external periphery of two-channel safety switches (not shown). The signal SH1 is applied to the pulse inhibiting circuit I1 and the signal SH2 is applied to the pulse inhibiting circuit I2. The systems I1 and I2 test the input signals for quality by exchanging information via a communications link KOMM, and in the event of a discrepancy inhibit the pulses by means of the switches S1 and S2 and the drive unit ST. The respective supply voltages SV1 and SV2 are present at corresponding outputs of pulse inhibiting paths IP1 and IP2. Each of the pulse inhibiting paths IP1 and IP2 includes a switch S1 and S2, respectively, with each of the switches S1 and S2 receiving control signals from a corresponding one of the pulse inhibiting circuits I1 and I2. The pulse inhibiting path IP1 and/or IP2 is equivalent to a disconnectable power supply which is disconnected when a "safe stop" is triggered. The output side of each pulse inhibiting path IP1 and IP2 is connected to an associated pulse inhibiting circuit I1, I2 via a diagnostic line which includes a decoupling diode, supplying corresponding diagnostic signals SV1_Diag and SV2_Diag to the pulse inhibiting circuits I1 and I2.

The opto-couplers OK1 to OK6 are arranged between the control electronics, which includes a microprocessor and a driver for each converter valve T1 to T6 of the self-commutated converter W. Transformers can also be used instead of the opto-couplers OK1 to OK6. This type of signal transmission device, i.e. opto-coupler and/or transformer, eliminates the effect of interference voltages on the microprocessor of the control electronics.

The function "safe stop" is implemented by a pulse inhibitor which is used to switch off the converter valves T1 to T6 of the inverter W during normal operation or when a fault is detected. Preferably, the supply voltage SV1 for the opto-couplers OK1, OK3, OK5 for the upper bridge arm of converter valves, which is derived from an external voltage SV, is interrupted by switch S1 (either a mechanical or an electronic switch) by applying a signal IL1 from the pulse inhibiting circuit I1. Another supply voltage SV2 for the opto-couplers OK2, OK4, OK6 for the lower bridge arm is interrupted by switch S2 (either a mechanical or an electronic switch) by applying a signal IL2 from the pulse inhibiting circuit I2, as well as by blocking the pulses in the control set ST.

The operation of the two pulse inhibiting paths IP1 and IP2 with the switches S1 and S2 can be checked cyclically and dynamically, for example each time after the supply voltage is switched on. For this purpose, the pulse controller I1 reads the supply voltage SV1 from the diagnostic signal SV1_Diag measured downstream of the switch S1 after the switch S1 has been activated, and the supply voltage SV2 from the diagnostic signal SV2_Diag measured downstream of the switch S2 after the switch S2 has been activated. Even if one of the pulse controllers I1 and I2 fails, the other correctly functioning pulse inhibiting controller I2 or I1 can still respond, since the aforedescribed forced dynamical operation can detect even so-called dormant errors.

Disconnectable paths have to be tested for errors, since the probability of a component failure is never zero. As mentioned above, the function "safe stop" requires two redundant disconnectable paths which are checked at predefined test intervals, for example every eight hours. This guarantees the required protection against single faults. However, the operation of the device must be interrupted for the test, which makes more frequent tests of the disconnectable paths impractical.

It is also possible to connect to switches electrically in parallel, in which case the parallel switches are decoupled by decoupling diodes. The functionality of these switches can be checked during operation by alternatingly turning the switches on and off. Moreover, a circuit for temporarily maintaining a DC voltage can be connected downstream of the two switches, so that the voltage of the control circuit(s) connected downstream is unaffected when the switches are briefly opened. Accordingly, the state of each switch can be tested in a forced dynamical operation without service interruption.

It would therefore be desirable and advantageous to improve the disconnectable voltage supplies of conventional drive controllers by obviating prior art shortcomings and providing a less complex switch configuration, so that the switches of converters can be tested more frequently and at arbitrary time intervals without service interruption.

SUMMARY OF THE INVENTION

According to one aspect of the present invention, a drive controller for a self-commutated converter having two half-bridges with converter valves includes a first control circuit having an output operatively connected to converter valves of one of the half-bridges, a first pulse inhibiting controller associated with the first control circuit, a second control circuit having an output operatively connected to converter valves of the other half-bridge, and a second pulse inhibiting controller associated with the second control circuit. The drive controller further includes a plurality of switches, each switch defining a disconnectable pulse inhibiting path and receiving control signals from one of the first and second pulse inhibiting controllers. Each of the pulse inhibiting paths has an input which is connected to an external voltage, and an output which is connected, on one hand, via a diagnostic line to a corresponding one of the first and second pulse inhibiting controllers and, on the other hand, to a corresponding control input of one of the first and second control circuits.

According to another aspect of the invention, a drive controller for a self-commutated converter having two half-bridges with converter valves includes at least one control circuit having an output operatively connected to converter valves of the half-bridges and at least one pulse inhibiting controller associated with the at least one control circuit in one-to-one correspondence. The drive controller further includes a plurality of switches, each switch defining a disconnectable pulse inhibiting path and receiving control signals from the at least one pulse inhibiting controller. Each of the pulse inhibiting paths has an input which is connected to an external voltage, and an output which is connected, on one hand, via a diagnostic line to the at least one pulse inhibiting controller and, on the other hand, to a corresponding control input of the at least one control circuit.

According to yet another aspect of the invention, a method for testing functionality of a pulse inhibiting path in a drive controller for a self-commutated converter having two half-bridges with converter valves includes the steps of measuring a load phase current supplied by the converter valves, determining a polarity of the load phase current, and actuating a switch in the pulse inhibiting path if the load phase current in a converter valve operationally connected to the pulse inhibiting path is less than zero.

By being able to separate each signal transmission device, i.e. the opto-coupler and/or transformer, of the two control circuits by a pulse inhibition paths from an external voltage, each switch of the pulse inhibiting paths can be activated for forced dynamic operation during the operation of the self-commutated converter. The corresponding pulse inhibiting circuit can determine based on the individual diagnostic signals if each switch can be opened.

A switch disposed in a pulse inhibition paths can be tested precisely at the time, when its corresponding converter valve of the self-commutated converter is switched off or the second converter valve of the same bridge arm is switched on. This requires a synchronization logic between the forced dynamic switch-off and the control signal, which is not operational during a normal "safe stop."

To reduce complexity, the forced dynamic operation can become effective when the associated converter valve of the self-commutated converter is prevented from conducting a current due to the polarity of the load current. Because the time intervals with a constant polarity are quite long, the polarity can be determined by a simple interrogation.

Advantageous embodiments of the invention may include one or more of the following features. Each diagnostic line includes a decoupling diode. The plurality of switches may include a mechanical switch and/or an electronic switch and/or an interruptible semiconductor switch. The control circuit may include an opto-coupler.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
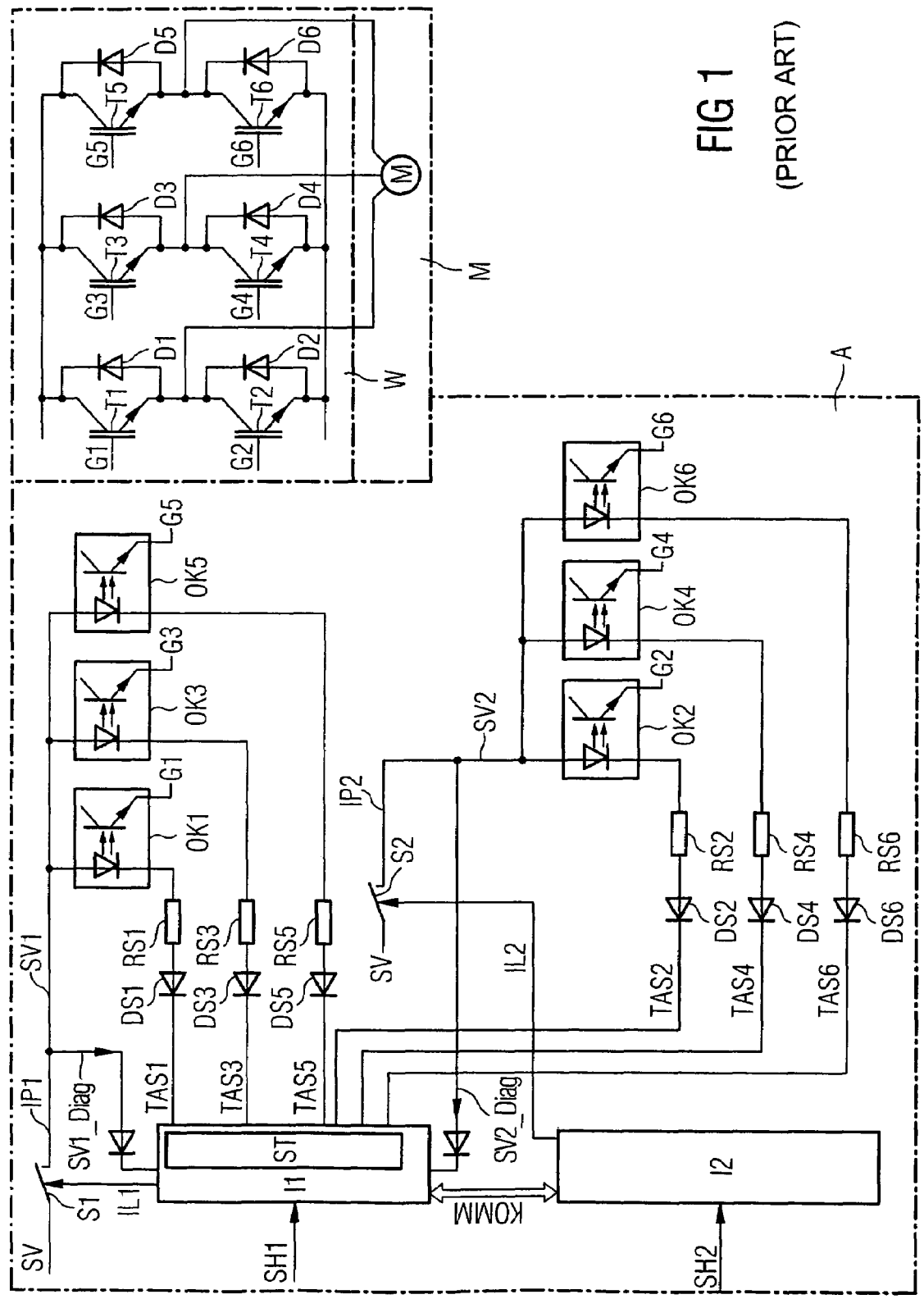
FIG. 1 is a block circuit diagram of a conventional drive controller having the function "safe stop"

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
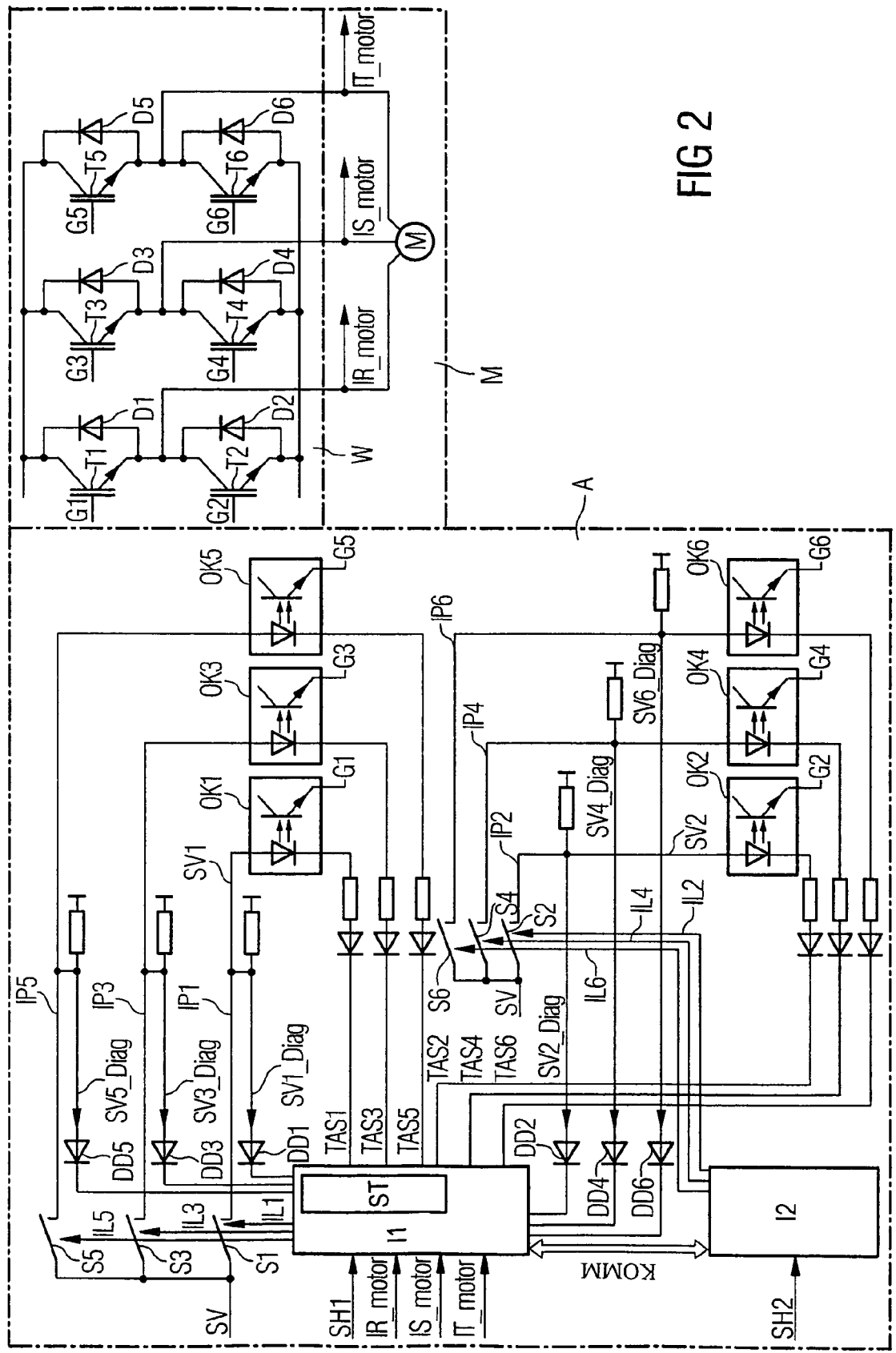
FIG. 2 is an embodiment of the drive controller according to the invention.

Turning now to the drawing, and in particular to FIG. 2, there is shown a block circuit diagram of a drive controller according to the invention. As in the block circuit diagram of FIG. 1, the function "safe stop" is "reliably" selected via the two signals SH1 and SH2, with signal SH1 is applied to pulse inhibiting circuit I1 and the signal SH2 is applied to pulse inhibiting circuit I2. The systems I1 and I2 test the input signals for quality by exchanging information via a communications link KOMM, and in the event of a discrepancy inhibit the pulses by activating switches S1, S2, . . . , S6 and the drive unit ST, as will be described below. However, unlike in the block circuit diagram of FIG. 1, each opto-coupler of the control circuits can be disconnected from the external voltage during operation of the self-commutated converter through a dedicated pulse inhibiting path IP1, IP3, IP5 IP2, IP4, and IP6, which is controlled by the switches S1, S2, . . . , S6. The design of the pulse inhibiting path is otherwise identical to that in the embodiment of FIG. 1.

The output of each of the pulse inhibiting paths IP1, . . . , IP6 is connected to a diagnostic line, with a corresponding decoupling diode DD1, DD3, DD5, DD2, DD4, and DD6 arranged in each of the diagnostic lines. These decoupling diodes DD1 to DD6 transmit diagnostic signals SV1_Diag, SV3_Diag, SV5_Diag, SV2_Diag, SV4_Diag, and SV6_Diag to the pulse inhibiting controller IP1. The switches S1, S3, S5, S2, S4, and S6 are controlled by the pulse inhibiting controllers IP1 and IP2, respectively.

The forced dynamic operation can be controlled by supplying the measured load phase currents IR_motor, IS_motor, and IT_motor to the pulse inhibiting controller IP1. These load phase currents IR_motor, IS_motor, and IT_motor are needed anyway for controlling the drive, in particular the self-commutated converter, so that they need not be determined separately for controlling the forced dynamic operation. The switches S1 to S6 are controlled depending on the measured currents IR_motor, IS_motor, and IT_motor, in particular their polarity, so that the operation of the self-commutated converter W need not be interrupted. For this purpose, a switch S1 or S3 or S5 or S2 or S4 or S6 is activated precisely at the time when the polarity of the load phase current IR_motor, IS_motor, and IT_motor prevents the converter valve T1 or T3 or T5 or T2 or T4 or T6 associated with the particular switch S1, . . . , S6 from conducting electric current. Stated differently, the switch S1 is activated when the load phase current IR_motor is less than zero. Because the time intervals when the load phase currents IR_motor, IS_motor, and IT_motor have a constant polarity are relatively long, the point in time for activating a corresponding switch S1 or S3 or S5 or S2 or S4 or S6 can be determined by a simple interrogation.

With the aforedescribed embodiment of a drive controller A, the switches S1, S3, S5, S2, S4, and/or S6 of the pulse inhibiting paths IP1, . . . , IP6 can now be tested without service interruption of the self-commutated converter W. The switches S1, S3, S5, S2, S4, and/or S6 are controlled by evaluating the polarity of the existing load phase currents IR_motor, IS_motor, and IT_motor. This forced dynamic operation without service interruption can be implemented with circuitry that is much less complex than conventional circuitry.

While the invention has been illustrated and described in connection with currently preferred embodiments shown and described in detail, it is not intended to be limited to the details shown since various modifications and structural changes may be made without departing in any way from the spirit of the present invention. For example, although the pulse controllers I1, I2 are shown as two separate controllers, they may be combined into a single controller as long as they can independently actuate the switches. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A drive controller for a self-commutated converter having two half-bridges with converter valves, said drive controller comprising:
   a first control circuit having input terminals connected to phase outputs of the converter valves in one-to-one correspondence and receiving from the converter valves corresponding load phase currents, and separate outputs operatively connected to corresponding couplers that each control a converter valve of one of the half-bridges;
   a second control circuit operatively connected to the first control circuit and having separate outputs operatively connected to corresponding couplers that each control a converter valve of the other half-bridge;
   wherein each of the
   couplers is connected via a dedicated pulse inhibiting path to a dedicated controllable switch configured for separately disconnecting the respective dedicated pulse inhibiting path from an external voltage, with a corresponding control input of each dedicated controllable switch receiving a respective control signal from one of the first and second control circuits for disconnecting the respective dedicated controllable switch from the external voltage if a load phase current received from a corresponding converter valve has negative polarity.

2. The drive controller of claim 1, wherein each diagnostic line includes a decoupling diode.

3. The drive controller of claim 1, wherein the plurality of switches comprise a mechanical switch.

4. The drive controller of claim 1, wherein the plurality of switches comprise an electronic switch.

5. The drive controller of claim 1, wherein the plurality of switches comprise an interruptible semiconductor switch.

6. The drive controller of claim 1, wherein the first and second control circuits comprise an opto-coupler.

* * * * *